United States Patent
Katayama et al.

(10) Patent No.: US 12,139,078 B2
(45) Date of Patent: Nov. 12, 2024

(54) EXTERIOR COMPONENT FOR VEHICLE

(71) Applicants: AISIN CORPORATION, Kariya (JP); AISIN SINEI CO., LTD, Hekinan (JP)

(72) Inventors: Kosuke Katayama, Kariya (JP); Yuta Kobayashi, Hekinan (JP)

(73) Assignees: AISIN CORPORATION, Kariya (JP); AISIN SINEI CO., LTD, Hekinan (JP)

( * ) Notice: Subject to any disclaimer, the term of this patent is extended or adjusted under 35 U.S.C. 154(b) by 0 days.

(21) Appl. No.: 18/346,239

(22) Filed: Jul. 2, 2023

(65) Prior Publication Data

US 2024/0001865 A1 Jan. 4, 2024

(30) Foreign Application Priority Data

Jul. 4, 2022 (JP) .................. 2022-107536

(51) Int. Cl.
*B60R 13/00* (2006.01)
(52) U.S. Cl.
CPC .................. *B60R 13/005* (2013.01)
(58) Field of Classification Search
CPC ................................................ B60R 13/005
See application file for complete search history.

(56) References Cited

U.S. PATENT DOCUMENTS

2019/0162445 A1 5/2019 Fukui et al.
2021/0187868 A1* 6/2021 Tanaka ..................... B32B 27/32

FOREIGN PATENT DOCUMENTS

JP 2014-226913 A 12/2014
JP 2019-100554 A 6/2019

OTHER PUBLICATIONS

McKeen, Laurence W.( 2008), Effect of Temperature and Other Factors on Plastics and Elastomers (2nd Edition)—12.1 Background William Andrew Publishing/Plastics Design Library; <br>https://app.knovel.com/hotlink/pdf/id:kt00512F2T/effect-temperature-other/effect-tem-background (Year: 2008).*
Biron, Michel, (2018); Thermoplastics and Thermoplastic Composites (3rd Edition)—7.7.8 Refractive Index of Thermoplastics (pp. 935); https://app.knovel.com/hotlink/pdf/id:kt011Q2AWF/thermoplastics-thermoplastic/refractive-index-thermoplastics (Year: 2018).*

* cited by examiner

*Primary Examiner* — Laura C Powers
(74) *Attorney, Agent, or Firm* — Finnegan, Henderson, Farabow, Garrett, and Dunner, LLP (57) ABSTRACT

An exterior component of a vehicle includes a substrate and a multilayer coating film covering a surface of the substrate, the multilayer coating film includes a first coating film closest to the substrate, a second coating film that is in contact with the first coating film and covers a part of the surface of the first coating film, and a third coating film that is transparent and covers the first coating film and the second coating film so as to be in contact with the second coating film and a portion of the first coating film that is not covered with the second coating film, and the third coating film has a refractive index of 1.5210 or more.

10 Claims, 4 Drawing Sheets

EXTERIOR COMPONENT FOR VEHICLE

CROSS REFERENCE TO RELATED APPLICATIONS

This application is based on and claims priority under 35 U.S.C. § 119 to Japanese Patent Application No. 2022-107536, filed on Jul. 4, 2022, the entire content of which is incorporated herein by reference.

TECHNICAL FIELD

The present disclosure relates to an exterior component for a vehicle.

BACKGROUND DISCUSSION

Conventionally, a component to which an emblem indicating a manufacturer name, a vehicle type name, and the like is attached or a component to which a seal and the like are attached is known as an exterior component for a vehicle. Such an exterior component for a vehicle is required to have a high aesthetic sense (visual quality) in order to give a sense of luxury in a vehicle. Further, such an exterior component for a vehicle is required to have high durability because it may be exposed to sunlight, wind and rain, and chemicals (for example, detergents during car washing).

JP 2019-100554 A discloses a configuration in which characters, symbols, and the like are printed on an exterior case of a hot water unit by ink jet printing, and a surface of the exterior case is covered with a clear coating layer. Further, JP 2014-226913 A discloses a configuration in which a design is applied to a building material by ink jet printing, and a surface of the building material is covered with a clear layer.

Incidentally, when minute irregularities are present on a surface of a coating film on which characters and the like are formed, light is easily diffusely reflected on the surface, so that sharpness of characters and the like is decreased (that is, characters and the like appear blurred). Therefore, in order to improve the aesthetic sense of the exterior component, it is preferable to improve the sharpness of characters and the like. In particular, since an ink jet type coating apparatus injects minute ink toward an object to be coated, minute irregularities are likely to occur on a surface of printed characters and the like (that is, the surface of the formed coating film).

A need thus exists for an exterior component for a vehicle which is not susceptible to the drawback mentioned above.

SUMMARY

An exterior component of a vehicle includes a substrate and a multilayer coating film covering a surface of the substrate, wherein the multilayer coating film has a first coating film closest to the substrate, a second coating film that is in contact with the first coating film and covers a part of a surface of the first coating film, and a third coating film that is transparent and covers the first coating film and the second coating film so as to be in contact with the second coating film and a portion of the first coating film that is not covered with the second coating film, and the third coating film has a refractive index of 1.5210 or more.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of the present disclosure will be described with reference to the drawings. An exterior component of a vehicle according to each embodiment of the present disclosure is a component attached to outside of the vehicle such that at least a part of the exterior component is exposed on the outside of the vehicle. The exterior component of a vehicle according to the present embodiment may be a functional component or a decorative component (sometimes referred to as garnish). Exterior components of a vehicle according to each embodiment are, for example, an outside door handle, an emblem indicating a manufacturer or a vehicle type or a component to which such an emblem is attached, a center pillar garnish, a rear garnish, a front garnish, a frame molding, a fuel lid cover, a spoiler, a roof panel, a side mirror, and the like. Hereinafter, an exterior component of a vehicle may be simply abbreviated as an exterior component.

First Embodiment

Figure 1:
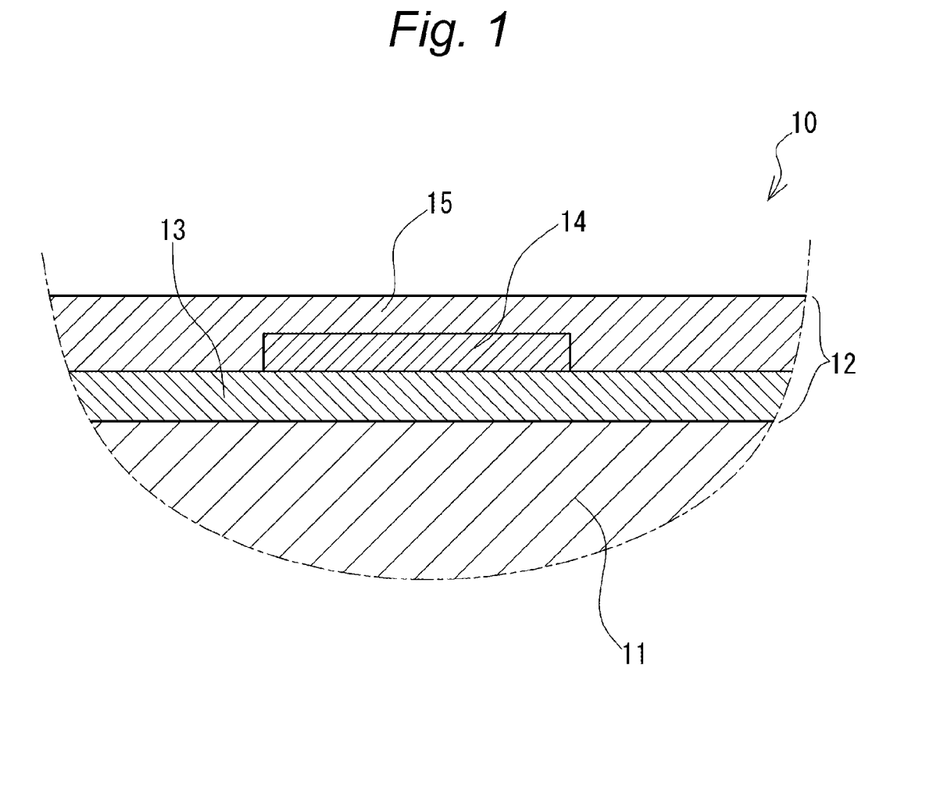
FIG. 1 is a schematic diagram illustrating a configuration of an exterior component of a vehicle according to a first embodiment.

FIG. 1 is a schematic view illustrating a cross-sectional structure of an exterior component 10 according to a first embodiment. As illustrated in FIG. 1, the exterior component 10 includes a substrate 11 and a multilayer coating film 12 provided on a surface of the substrate 11.

The substrate 11 is a member constituting a portion of the exterior component 10 where the multilayer coating film 12 is provided. When the exterior component 10 has a configuration that includes only the substrate 11 and the multilayer coating film 12, it can also be said that the substrate 11 is an exterior component 10 before coating (uncoated). When the exterior component 10 has a configuration that includes a component other than the substrate 11, it can also be said that the substrate 11 is a member constituting a main portion (a portion visible from the outside of the vehicle) of the exterior component 10 before coating. A material of the substrate 11 is not limited, and is appropriately set according to a type of the exterior component 10 and the like. For example, when the exterior component 10 is an outside door handle, an emblem, or a center pillar as described above, a thermoplastic resin material such as a mixed material of polycarbonate and polybutylene terephthalate can be applied to the material of the substrate 11. Note that, in a case where a thermoplastic resin material is applied to the substrate 11, a resin material having a softening temperature (a heat resistance temperature) higher than a glass transition temperature of each of a base coating film 13, a decorative coating film 14, and a protective coating film 15 of the multilayer coating film 12 to be described later is applied to the substrate. In addition, a metal material may be applied as the material of the substrate 11.

The multilayer coating film 12 is provided on an outer surface of the substrate 11. The multilayer coating film 12 includes three coating films of the base coating film 13, the decorative coating film 14, and the protective coating film 15 laminated to each other. The base coating film 13 is an example of a first coating film of the present disclosure, the decorative coating film 14 is an example of a second coating film of the present disclosure, and the protective coating film 15 is an example of a third coating film of the present disclosure. Note that the multilayer coating film 12 may be provided on the entire surface of the substrate 11, or may be provided on a part of the surface of the substrate 11 (for example, a portion that is visible from the outside of the vehicle in a state where the exterior component 10 is attached to the vehicle).

The base coating film 13 is located on the side closest to the surface of the substrate 11, and is in direct contact with the surface of the substrate 11 in the present embodiment. By providing the base coating film 13 on the surface of the substrate 11 (covering the surface of the substrate 11), a color of the base coating film 13 becomes a basic color of the exterior component 10. In other words, it can also be said that "the color of the base coating film 13 is the color of a ground of the exterior component 10". A coating material made of a resin material having a glass transition temperature lower than the glass transition temperature of the protective coating film 15 to be described later, and a coating material containing a resin material having a glass transition temperature lower than the glass transition temperature of the protective coating film 15 to be described later as a main component can be applied to the base coating film 13. For example, a coating material containing an ultraviolet curable acrylic resin material as a main component can be applied to the base coating film 13. In a case where the substrate 11 is metal, the base coating film 13 may contain a silane coupling agent in order to enhance bonding strength between the substrate 11 and the base coating film 13. Note that the glass transition temperature of the base coating film 13 will be described later.

Note that a color and a texture of the base coating film 13 are not limited, but for example, in a case where the exterior component 10 has a metal-like texture, a silver color having luster is applied as the color of the base coating film 13. In this case, a resin material in which a filler made of a metal material or a filler made of a material having metallic luster is dispersed can be applied to the base coating film 13. Further, in the present embodiment, the base coating film 13 is opaque.

The decorative coating film 14 is a coating film for representing at least one of characters, symbols, patterns, and figures (hereinafter, sometimes referred to as characters and the like) on the surface of the exterior component 10. It can also be said that "the decorative coating film 14 is a coating film that decorates the exterior component 10". The decorative coating film 14 is laminated and provided on a part of the surface of the base coating film 13, and is in direct contact with a surface of the base coating film 13 on the side opposite to the substrate 11. Similarly to the base coating film 13, a coating material made of a resin material having a glass transition temperature lower than the glass transition temperature of the protective coating film 15 to be described later, or a coating material containing a resin material having a glass transition temperature lower than the glass transition temperature of the protective coating film 15 to be described later as a main component can be applied to the decorative coating film 14. For example, an ultraviolet curable acrylic coating material containing isobornyl acrylate as a main component can be applied to the decorative coating film 14. In the present embodiment, the decorative coating film 14 is opaque. However, the color of the decorative coating film 14 is not limited. Further, the decorative coating film 14 may have a single color or a plurality of colors. Note that the glass transition temperature of the decorative coating film 14 will be described later.

The protective coating film 15 is a coating film laminated and provided on the base coating film 13 and the decorative coating film 14, and is a coating film provided on an outermost side of the multilayer coating film 12 (that is, a position farthest from the substrate 11). The protective coating film 15 has a function of protecting the base coating film 13 and the decorative coating film 14 and a function of improving an aesthetic sense of an appearance of the exterior component 10. The protective coating film 15 is transparent, and the base coating film 13 and the decorative coating film 14 are visible from the outside of the vehicle through the protective coating film 15. A transparent material having a refractive index in a range to be described later is applied to the protective coating film 15. Further, a coating material having a glass transition temperature higher than those of the base coating film 13 and the decorative coating film 14 is applied to the protective coating film 15. For example, a coating material containing a two-component acrylic resin material as a main component is applied to the protective coating film 15. Note that the protective coating film 15 may contain an additive for obtaining a predetermined refractive index. As an additive for obtaining a predetermined refractive index, for example, urethane can be applied. In this case, the refractive index of the protective coating film 15 increases as the content of urethane increases.

The protective coating film 15 may contain a light stabilizer such as an ultraviolet absorber in order to improve weather resistance. In addition, the protective coating film 15 may appropriately contain an antifoaming agent, an antifungal agent, an antiseptic agent, and the like.

An ink jet type coating apparatus (a printing apparatus) can be used for forming each of the base coating film 13, the decorative coating film 14, and the protective coating film 15. According to the method using the ink jet type coating apparatus, a furnace for drying after coating (after forming each coating film) is unnecessary, which can reduce generation of $CO_2$. Further, since a nozzle for discharging the coating material, which is the material of each coating film, can be brought close to the substrate 11, waste of the coating material (the coating material that does not reach the substrate 11) can be reduced. Further, even when irregularities are present on the surface of the substrate 11, a coating film can be formed. Further, when an ultraviolet curable coating material is applied to the base coating film 13, the decorative coating film 14, and the protective coating film 15, the coating material can be immediately cured by irradiating the coating material with ultraviolet light after applying the coating material that is the material of the coating film to form a coating film.

After forming all the coating films, strength of each coating film is enhanced by a baking step. A heating temperature in this baking step is a temperature higher than or equal to a temperature (a crosslinking temperature) necessary for improving the strength of each coating film, higher than the glass transition temperatures of the base coating film 13 and the protective coating film 15, and lower than the heat resistance temperature of the substrate 11 (a temperature at which the substrate 11 is softened). Details will be described later.

(Refractive Index of Protective Coating Film)

A refractive index of the protective coating film 15 is 1.5210 or more. The reason is as follows. When fine irregularities are present at an interface between the decorative coating film 14 and the protective coating film 15 (it can also be said that this interface is the surface of the decorative coating film 14), light incident on this interface from the outside of the multilayer coating film 12 through the protective coating film 15 may be diffusely reflected at the interface. In particular, when the protective coating film 15 is formed by an ink jet type coating apparatus, irregularities are easily formed on the surface of the decorative coating film 14, so that diffused reflection easily occurs at this interface. Then, when an amount of light diffusely reflected at this interface is large, an image of the characters and the like represented by the decorative coating film 14 may appear blurred.

In order to make the image of the characters and the like represented by the decorative coating film 14 clearly visible, it is preferable to reduce the amount of light diffusely reflected at the interface. Then, when the refractive index of the protective coating film 15 increases, reflectance of the surface of the protective coating film 15 increases, so that the amount of light incident on the interface decreases, and as a result, the amount of light diffusely reflected at the interface decreases. For this reason, the image of the characters and the like represented by the decorative coating film 14 becomes clearly visible, so that the aesthetic sense of the appearance (visual quality) of the exterior component 10 can be improved.

Figure 2A:
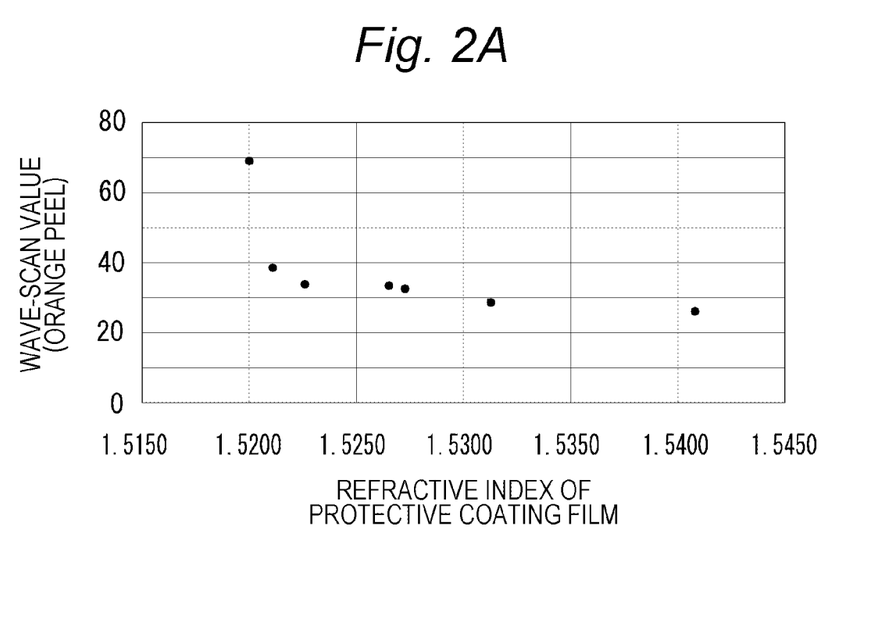
FIG. 2A is a graph illustrating a relationship between a refractive index of a protective coating film and a wave-scan value.
Figure 2B:
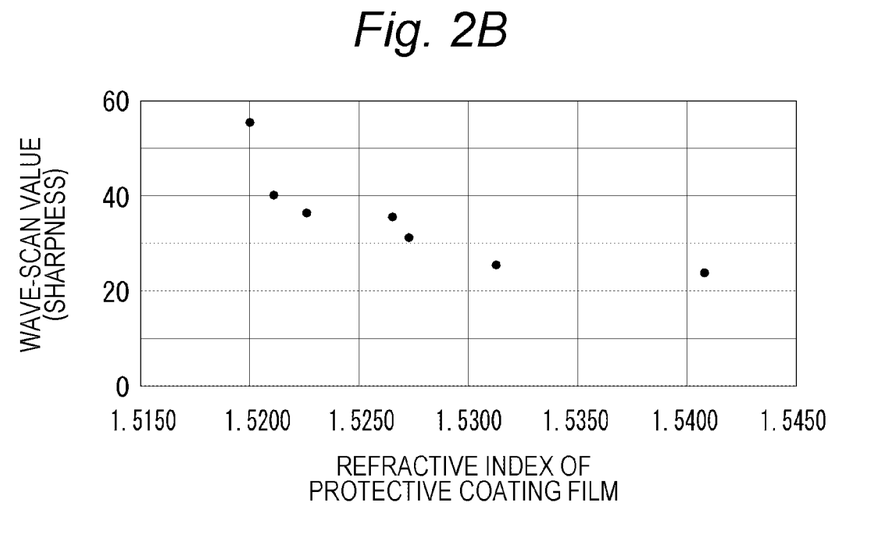
FIG. 2B is a graph illustrating the relationship between the refractive index of the protective coating film and the wave-scan value.

FIGS. 2A and 2B are graphs each showing a relationship between the refractive index of the protective coating film 15 and a wave-scan value. FIG. 2A is a numerical representation of a degree of orange peel of the exterior component 10, and FIG. 2B is a numerical representation of sharpness. A wave-scan value indicating the degree of orange peel indicates that the smaller the value, "the smoother the surface of the object to be measured appears". The wave-scan value indicating sharpness indicates that the smaller the value is, "the clearer the surface of the object to be measured appears (that is, the characters and the like represented by the decorative coating film 14 appear clear (the sharpness is increased))". Note that a mixed material of polycarbonate and polybutylene terephthalate was used for the substrate 11, an acrylic resin-based coating material was used for the base coating film 13, a UV curable acrylic resin-based ink was used for the decorative coating film 14, and an acrylic resin-based coating material was used for the protective coating film 15. As shown in FIGS. 2A and 2B, when the refractive index of the protective coating film 15 is 1.5210 or more, the wave-scan value is 40.0 or less, and the sharpness of the characters and the like represented by the decorative coating film 14 is increased. Further, when the refractive index of the protective coating film 15 is in a range of 1.5210 or more, a fluctuation of the wave-scan value is small. Therefore, from a viewpoint of the aesthetic sense of the appearance of the exterior component 10 (from a viewpoint of the sharpness of the characters and the like represented by the decorative coating film 14), the refractive index of the protective coating film 15 is set to 1.5210 or more.

On the other hand, as is clear from FIGS. 2A and 2B, even when the refractive index of the protective coating film 15 becomes higher than 1.5300, the wave-scan value is hardly decreased. For this reason, an upper limit of the refractive index of the third coating film is not limited from the viewpoint of the aesthetic sense of the appearance of the exterior component 10. Conversely, even when the refractive index of the protective coating film 15 exceeds 1.5300, the sharpness of the characters and the like represented by the decorative coating film 14 is not increased. As described above, in a configuration in which the coating material as the material of the decorative coating film 14 contains an additive for increasing the refractive index, a material cost of the protective coating film 15 increases as the content of the additive increases. For this reason, from a viewpoint of the material cost (that is, a product price) of the protective coating film 15, the refractive index of the protective coating film 15 is preferably 1.5300 or less.

According to the configuration in which the multilayer coating film 12 includes the protective coating film 15 as described above, while durability, weather resistance, and chemical resistance of the base coating film 13 and the decorative coating film 14 are improved by protecting the decorative coating film 14, the aesthetic sense of the appearance of the exterior component 10 can be improved by enhancing the sharpness of the characters and the like represented by the decorative coating film 14. In particular, the exterior component 10 of a vehicle is exposed to direct sunlight, wind, and rain, and chemicals such as detergents may adhere to the exterior component during vehicle washing. According to the present embodiment, it is possible to improve the aesthetic sense of the appearance of the exterior component 10 while securing the durability, weather resistance, and chemical resistance required for the exterior component 10 of a vehicle.

Figure 3A:
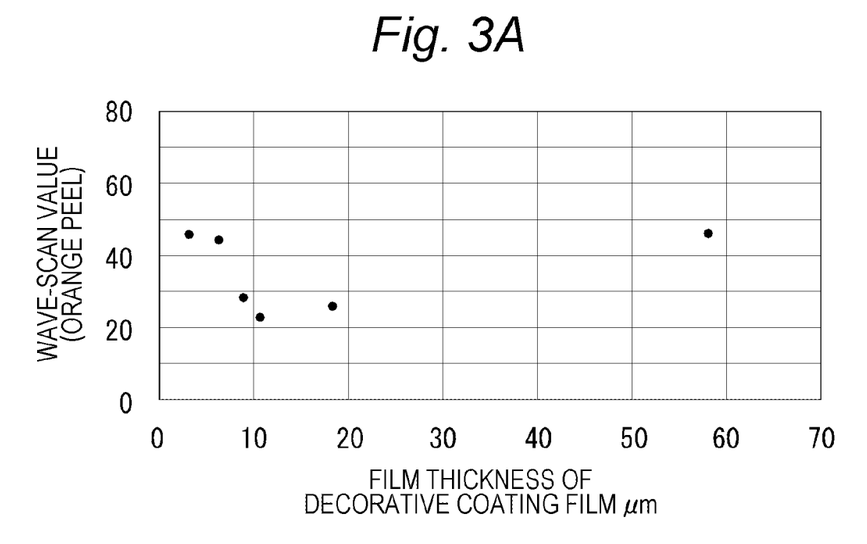
FIG. 3A is a graph illustrating a relationship between a film thickness of the protective coating film and the wave-scan value.
Figure 3B:
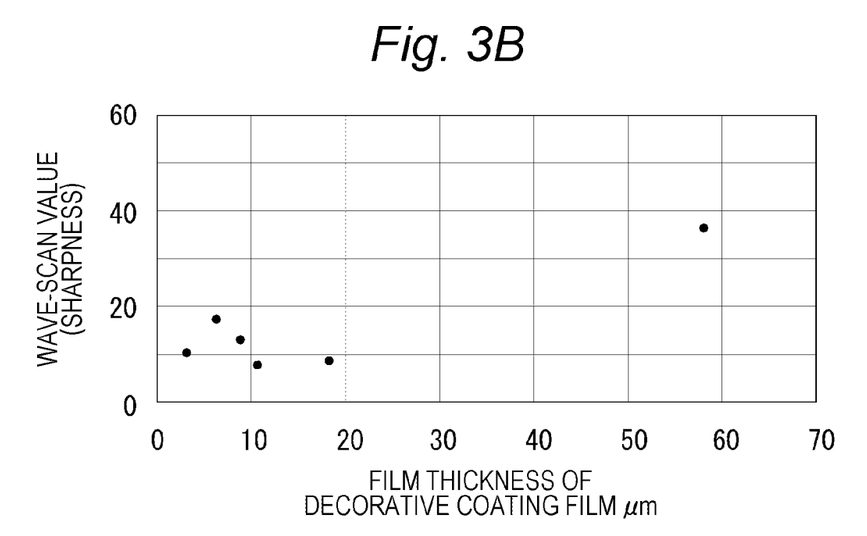
FIG. 3B is a graph illustrating the relationship between the film thickness of the protective coating film and the wave-scan value.

FIGS. 3A and 3B are graphs each showing a relationship between a film thickness of the protective coating film 15 and the wave-scan value. As shown in FIGS. 3A and 3B, no strong correlation was found between the film thickness of the protective coating film 15 and the wave-scan value within a range of the evaluated film thickness (specifically, the film thickness is in a range of 3.13 to 58.05 μm). Therefore, the film thickness of the protective coating film 15 is not particularly limited. At least when the film thickness of the protective coating film 15 is in the range of 3.13 to 58.05 μm, it is possible to achieve an effect of "enhancing the sharpness of the characters and the like represented by the decorative coating film 14" by the protective coating film 15.

(Softening Temperature of Substrate and Glass Transition Temperature of Each Coating Film)

Next, the softening temperature of the substrate 11 and the glass transition temperature of each coating film (note that it can also be said that the glass transition temperature of each coating film is the glass transition temperature of the resin material that is the main component of each coating film) will be described. In the present embodiment, the substrate 11 is made of a thermoplastic resin material that is softened at a temperature higher than 80° C. As described above, in a case of a configuration in which the mixed material of polycarbonate and polybutylene terephthalate is applied to the substrate 11, the softening temperature (a heat resistance temperature) is 102° C. Note that the substrate 11 may be formed of a resin material that is a thermoplastic resin material and contains a resin material softened at a temperature higher than as a main component. In short, the substrate 11 only need be softened at a predetermined temperature.

In a case where the substrate 11 is made of a thermoplastic material or in a case where the substrate 11 contains a thermoplastic material, the glass transition temperatures of the base coating film 13, the decorative coating film 14, and the protective coating film 15 are lower than the softening temperature (the heat resistance temperature) of the substrate 11. In a case where the substrate 11 is made of a resin material that is softened at a temperature higher than 80° C. as described above, the glass transition temperatures of the base coating film 13, the decorative coating film 14, and the protective coating film 15 are lower than or equal to 80° C.

According to such a configuration, in the baking step after forming each coating film, by heating the exterior component 10 to a temperature (80° C. in the present embodiment) that is higher than or equal to the glass transition temperatures of the base coating film 13 and the decorative coating film 14 and lower than the softening temperature of the substrate 11, adhesion between the base coating film 13 as well as the decorative coating film 14 and the protective coating film 15 can be enhanced while preventing or suppressing deformation of the substrate 11. Specifically, the base coating film 13 and the decorative coating film 14 can be softened to relax stress between the base coating film 13 as well as the decorative coating film 14 and the protective coating film 15. Further, by softening the base coating film 13, a mixed phase of the base coating film 13 and the protective coating film 15 can be formed at the interface between the base coating film 13 and the protective coating film 15 and in the vicinity thereof. This can enhance the adhesion (the bonding strength) between the base coating film 13 and the protective coating film 15. Similarly, by softening the decorative coating film 14, a mixed phase of the decorative coating film 14 and the protective coating film 15 can be formed at the interface between the decorative coating film 14 and the protective coating film 15 and in the vicinity thereof. This can enhance the adhesion (the bonding strength) between the decorative coating film 14 and the protective coating film 15. In other words, an anchor effect can enhance the bonding strength between the base coating film 13 as well as the decorative coating film 14 and the protective coating film 15. Therefore, the durability of the multilayer coating film 12 can be enhanced, and particularly, peeling of the protective coating film 15 can be prevented or suppressed.

Furthermore, the glass transition temperatures of the base coating film 13 and the decorative coating film 14 are preferably lower than the glass transition temperature of the protective coating film 15. For example, in a case where about 80° C., which is lower than the softening temperature of the substrate 11, is applied as the glass transition temperature of the protective coating film 15, the glass transition temperatures of the base coating film 13 and the decorative coating film 14 are preferably lower than or equal to 40° C. With such a configuration, in the baking step after forming each coating film, by heating the exterior component 10 to a temperature (for example, about 80° C.) that is higher than the glass transition temperatures of the base coating film 13 and the decorative coating film 14 and near the glass transition temperature of the protective coating film 15, while the deformation due to softening of the protective coating film 15 is prevented or suppressed, the base coating film 13 and the decorative coating film 14 can be softened to improve the adhesion between the base coating film 13 as well as the decorative coating film 14 and the protective coating film 15.

Further, when the glass transition temperature of the protective coating film 15 is higher than the glass transition temperatures of the base coating film 13 and the decorative coating film 14, softening of the protective coating film 15 is prevented or suppressed even when the temperature of usage environment of a vehicle rises to the glass transition temperatures of the base coating film 13 and the decorative coating film 14 or higher, so that the deformation of the base coating film 13 and the decorative coating film 14 is prevented or suppressed. As described above, by setting the glass transition temperature of the protective coating film 15 to be higher than the glass transition temperatures of the base coating film 13 and the decorative coating film 14, it is possible to prevent or suppress the deformation of the base coating film 13 and the decorative coating film 14 while enhancing the adhesion between the base coating film 13 as well as the protective coating film 14 and the decorative coating film 15.

Note that, from a viewpoint of the durability, weather resistance, and chemical resistance, a lower limit of the glass transition temperatures of the base coating film 13 and the decorative coating film 14 is not limited. However, when the glass transition temperatures of the base coating film 13 and the decorative coating film 14 are lower than or equal to a temperature of usual usage environment of a vehicle (a so-called normal temperature), the base coating film 13 and the decorative coating film 14 may be softened during vehicle use. Then, when a body of a user and the like or an object comes into contact with the exterior component 10 in a state where the base coating film 13 and the decorative coating film 14 are softened, the base coating film 13 and the decorative coating film 14 may be deformed. Therefore, the glass transition temperatures of the base coating film 13 and the decorative coating film 14 are preferably higher than the normal temperature (for example, higher than 20° C.), and are preferably higher than a maximum temperature assumed for a usage environment of a vehicle.

Figure 4:
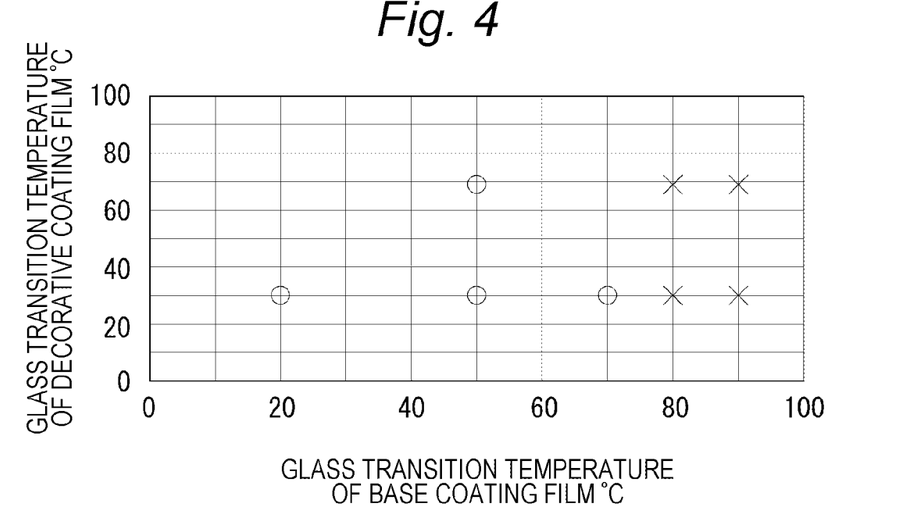
FIG. 4 is a graph illustrating a relationship between glass transition temperatures of a base coating film and a decorative coating film and adhesion of the protective coating film.

Next, evaluation results of the adhesion between the base coating film 13 as well as the decorative coating film 14 and the protective coating film 15 will be described. FIG. 4 is a graph showing a relationship between the glass transition temperatures of the base coating film 13 and the decorative coating film 14, and the adhesion between the base coating film 13 as well as the decorative coating film 14 and the protective coating film 15. A cross-cut test (a cross-cut adhesion test) was applied for evaluation of adhesion. The mixed material of polycarbonate and polybutylene terephthalate was used for the substrate 11. The softening temperature of the substrate 11 is 102° C. An acrylic resin coating material was used for the base coating film 13, a UV curable acrylic resin-based ink was used for the decorative coating film 14, and an acrylic resin-based coating material was used for the protective coating film 15. The heating temperature in the baking step was 80° C.

Then, in the cross-cut test, it was determined that the adhesion was good when no peeling occurred in any of lattices, and that the adhesion was poor when peeling occurred in any of the lattices. In the graph, "○ (white circle)" indicates that the adhesion is good, and "x (cross)" indicates that the adhesion is poor. As shown in FIG. 4, the adhesion was good when the glass transition temperature of the base coating film 13 was lower than or equal to 80° C., and the adhesion was poor when the glass transition temperature was higher than 80° C. Therefore, it was confirmed that the glass transition temperature of the base coating film 13 is preferably lower than or equal to 80° C.

Second Embodiment

Figure 5:
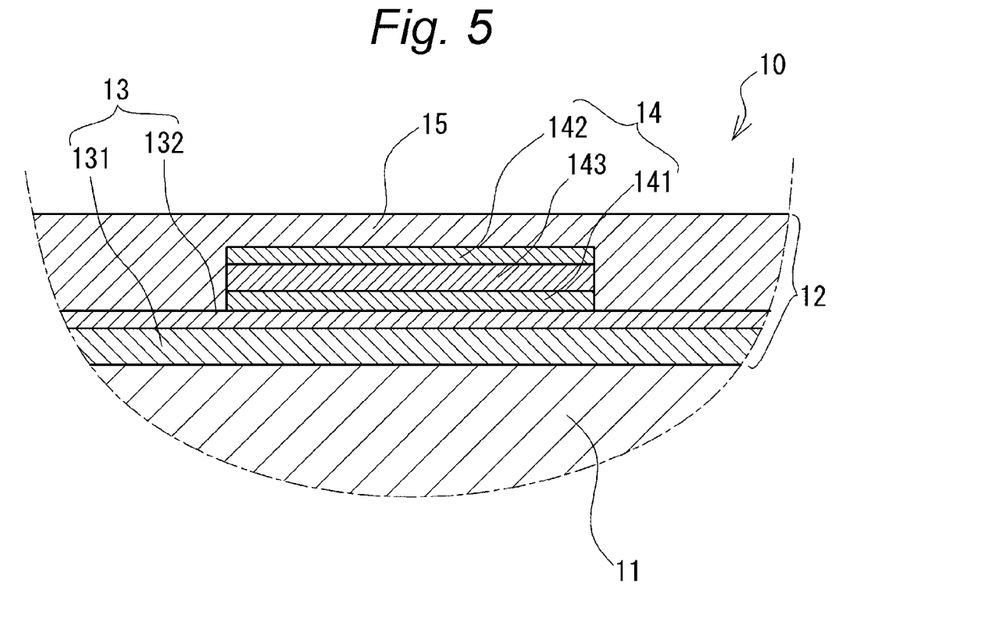
FIG. 5 is a schematic diagram illustrating the configuration of the exterior component of a vehicle according to the first embodiment.

Next, a second embodiment will be described. FIG. 5 is a schematic view illustrating a cross-sectional structure of an exterior component 10 according to the second embodiment. In the second embodiment, the base coating film 13 and the decorative coating film 14 each have a laminated structure of a plurality of coating films.

As shown in FIG. 5, the base coating film 13 includes a first sub-base coating film 131 on a side close to the substrate 11 and a second sub-base coating film 132 on a side close to the decorative coating film 14, and has a laminated structure of the first sub-base coating film 131 and the second sub-base coating film 132. The first sub-base coating film 131 is a coating film that defines a basic color of the exterior component 10. It can also be said that "a color of the first sub-base coating film 131 is a color of the ground of the exterior component 10". The second sub-base coating film 132 is a layer provided for improving adhesion (improving bonding strength) between the decorative coating film 14 and the protective coating film 15. Note that the second sub-base coating film 132 is transparent so that the color of the first sub-base coating film 131 is visible from the outside of the multilayer coating film 12. A film made of a transparent resin material having a glass transition temperature lower than that of the protective coating film 15 or a film containing such a resin material as a main component can be applied to the second sub-base coating film 132. Specifically, as the glass transition temperature of the second sub-base coating film 132, the same temperature as the glass transition temperature of the base coating film 13 of the multilayer coating film 12 according to the first embodiment can be applied. Note that the glass transition temperature of the first sub-base coating film 131 is not particularly limited.

The decorative coating film 14 includes a first sub-decorative coating film 141 in direct contact with the second sub-base coating film 132, a second sub-decorative coating film 142 in direct contact with the protective coating film 15, and a third sub-decorative coating film 143 located between the first sub-decorative coating film 141 and the second sub-decorative coating film 142. Note that the first sub-decorative coating film 141 and the third sub-decorative coating film 143 are in direct contact with each other, and the second sub-decorative coating film 142 and the third sub-decorative coating film 143 are in direct contact with each other. The first sub-decorative coating film 141 is a layer (a coating film) provided for improving adhesion to the base coating film 13. The second sub-decorative coating film 142 is a layer provided for improving adhesion to the protective coating film 15. Note that the second sub-decorative coating film 142 is transparent. The third sub-decorative coating film 143 is a coating film for decoration. The third sub-decorative coating film 143 is a layer colored in a predetermined color, and the color of the third sub-decorative coating film 143 defines a color of characters and the like represented by the decorative coating film 14. As described above, since the second sub-decorative coating film 142 is transparent, the color of the third sub-decorative coating film 143 is visible through the protective coating film 15 and the second sub-decorative coating film 142.

A film of a resin material having a glass transition temperature lower than the glass transition temperature of the protective coating film 15 or a resin material containing such a resin material as a main component can be applied to the first sub-decorative coating film 141 and the second sub-decorative coating film 142. For example, an ultraviolet curable acrylic resin material containing isobornyl acrylate as a main component can be applied to the first sub-decorative coating film 141 and the second sub-decorative coating film 142. Then, as the glass transition temperatures of the first sub-decorative coating film 141 and the second sub-decorative coating film 142, the same temperature as the glass transition temperature of the decorative coating film 14 of the multilayer coating film 12 according to the first embodiment can be applied. Note that the glass transition temperature of the third sub-decorative coating film 143 is not particularly limited.

The protective coating film 15 of the second embodiment has the same configuration as the protective coating film 15 of the first embodiment. In other words, the protective coating film 15 of the second embodiment is a transparent film having a refractive index of 1.5210 or more.

According to the second embodiment, the same effects as those of the first embodiment can be obtained. Furthermore, according to the second embodiment, restriction of the materials of the first sub-base coating film 131 (that is, a coating film that defines the basic color of the exterior component 10) and the third sub-decorative coating film 143 (that is, a coating film that defines the color of characters and the like) is reduced. For this reason, by applying an inexpensive coating material to the first sub-base coating film 131 and the third sub-decorative coating film 143, it is possible to reduce the material cost, or to prevent or suppress an increase in the material cost.

An exterior component of a vehicle includes a substrate and a multilayer coating film covering a surface of the substrate, wherein the multilayer coating film has a first coating film closest to the substrate, a second coating film that is in contact with the first coating film and covers a part of a surface of the first coating film, and a third coating film that is transparent and covers the first coating film and the second coating film so as to be in contact with the second coating film and a portion of the first coating film that is not covered with the second coating film, and the third coating film has a refractive index of 1.5210 or more.

According to such a configuration, by setting the refractive index of the third coating film to 1.5210 or more, the amount of light reflected by the surface of the third coating film can be increased, and the amount of light incident on the interface between the third coating film and the second coating film (the surface of the second coating film) from the outside of the multilayer coating film can be reduced. For this reason, even when the minute irregularities are present on the surface of the second coating film, the amount of light diffusely reflected on the surface is reduced, and as a result, the second coating film can be clearly visible. As described above, by covering the first coating film and the second coating film with the third coating film, it is possible to improve the aesthetic sense of the appearance of the exterior component while securing the durability, weather resistance, and chemical resistance of the first coating film and the second coating film.

In the exterior component of a vehicle, a configuration is applicable in which the substrate contains a thermoplastic resin material that is softened at a temperature higher than 80° C., and the glass transition temperatures of the first coating film and the second coating film are lower than or equal to 80° C.

According to such a configuration, by heating the exterior component of a vehicle to about 80° C. to soften the first coating film and the second coating film, it is possible to enhance adhesion between the first coating film as well as the second coating film and the third coating film while preventing or suppressing deformation of the substrate.

In the exterior component of a vehicle, a configuration is applicable in which the glass transition temperature of the second coating film is lower than the glass transition temperature of the third coating film.

According to such a configuration, the adhesion (the bonding strength) between the second coating film and the third coating film can be improved by heating the exterior component of a vehicle to a temperature higher than the glass transition temperature of the second coating film. Therefore, since the second coating film can be prevented or suppressed from peeling off from the third coating film, it is possible to improve the durability of the second coating film while preventing or suppressing deformation of the third coating film.

In the exterior component of a vehicle, a configuration is applicable in which the glass transition temperature of the second coating film is lower than or equal to 40° C., and the glass transition temperature of the third coating film is higher than or equal to 80° C. and lower than the softening temperature of the substrate.

According to such a configuration, when the glass transition temperature of the second coating film is lower than or equal to 40° C., the second coating film is heated to the glass transition temperature or higher to easily improve the adhesion between the second coating film and the third coating film. On the other hand, when the glass transition temperature of the third coating film is higher than or equal to 80° C., since the third coating film is prevented or suppressed from reaching the glass transition temperature or higher in a usual usage environment of a vehicle, the deformation of the third coating film is prevented or suppressed.

In the exterior component of a vehicle, a configuration is applicable in which the third coating film has a refractive index of 1.5300 or less.

According to such a configuration, since it is not necessary to increase the content of an additive and the like for increasing the refractive index of the third coating film, an increase in the material cost of the third coating film can be prevented or suppressed.

In the exterior component of a vehicle, a configuration is applicable in which the second coating film includes a colored film colored in a predetermined color, and a transparent film laminated on the third coating film side of the colored film, the transparent film being transparent and having a glass transition temperature lower than the glass transition temperature of the third coating film, and the transparent film is in direct contact with the third coating film.

According to such a configuration, since the restriction of the material and properties of the colored layer of the second coating film is reduced, an increase in the material cost of the second coating film can be prevented or suppressed.

In the exterior component of a vehicle, a configuration is applicable in which the first coating film includes a colored film colored in a predetermined color, and a transparent film laminated on the second coating film side of the colored film, the transparent film being transparent and having a glass transition temperature lower than the glass transition temperature of the third coating film, and the transparent film is in direct contact with the second coating film.

According to such a configuration, since the restriction of the material and properties of the colored layer of the first coating film is reduced, an increase in the material cost of the first coating film can be prevented or suppressed.

<Modifications>

Next, a modification of each embodiment will be briefly described. In a case where a hiding property of the decorative coating film 14 of the first embodiment is low, a film of a material having a high hiding property may be provided at a portion covered with the decorative coating film 14 between the base coating film 13 and the decorative coating film 14. Similarly, in a case where the hiding property of the third sub-decorative coating film 143 of the second embodiment is low, a film having a high hiding property may be provided between the first sub-decorative coating film 141 and the third sub-decorative coating film 143. In other words, the decorative coating film 14 may have a laminated structure of four layers. An ultraviolet curable acrylic resin colored in white or gray can be applied to such a film.

In a case where the substrate 11 is a metal such as steel, a film for improving corrosion resistance of the substrate 11 may be provided on the surface of the substrate 11. An epoxy resin film can be applied as such a film. In this case, the multilayer coating film 12 is not in direct contact with the surface of the substrate 11, but is in contact with a film for improving corrosion resistance. Furthermore, in this case, a film for preventing or suppressing transmission of light may be provided between the film for improving corrosion resistance of the substrate 11 and the multilayer coating film 12. As the film for preventing or suppressing such transmission of light, for example, a two-component acrylic resin material containing a filler made of a material having low light transmittance, or a film of a resin material containing such a two-component acrylic resin material as a main component can be applied.

Although the embodiments and the modification of the present disclosure have been described above, the present disclosure is not limited to the above embodiment. For example, the forming of each coating film is not limited to a method using an ink jet type coating apparatus.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An exterior component of a vehicle, comprising:
   a substrate, the substrate including polycarbonate and polybutylene terephthalate; and
   a multilayer coating film covering a surface of the substrate, wherein
   the multilayer coating film includes
      a first coating film closest to the substrate, the first coating film including an acrylic resin-based material,
      a second coating film that is in contact with the first coating film and covers a part of the surface of the first coating film, the second coating film including a UV-curable acrylic resin-based material, and a third coating film that is transparent and covers the first coating film and the second coating film so as to be in contact with the second coating film and a portion of the first coating film that is not covered with the second coating film, and the third coating film has a refractive index of 1.5210 or more, and includes an acrylic resin-based material.

2. The exterior component of a vehicle according to claim 1, wherein
the substrate contains a thermoplastic resin material that is softened at a temperature higher than 80° C., and
glass transition temperatures of the first coating film and the second coating film are lower than or equal to 80° C.

3. The exterior component of a vehicle according to claim 1, wherein
the glass transition temperature of the second coating film is lower than a glass transition temperature of the third coating film.

4. The exterior component of a vehicle according to claim 3, wherein
the glass transition temperature of the second coating film is lower than or equal to 40° C., and
the glass transition temperature of the third coating film is higher than or equal to 80° C. and lower than a softening temperature of the substrate.

5. The exterior component of a vehicle according to claim 1, wherein
the third coating film has a refractive index of 1.5300 or less.

6. The exterior component of a vehicle according to claim 2, wherein
the third coating film has a refractive index of 1.5300 or less.

7. The exterior component of a vehicle according to claim 3, wherein
the third coating film has a refractive index of 1.5300 or less.

8. The exterior component of a vehicle according to claim 4, wherein
the third coating film has a refractive index of 1.5300 or less.

9. An exterior component of a vehicle, comprising:
a substrate; and
a multilayer coating film covering a surface of the substrate, wherein
the multilayer coating film includes
a first coating film closest to the substrate,
a second coating film that is in contact with the first coating film and covers a part of the surface of the first coating film, and
a third coating film that is transparent and covers the first coating film and the second coating film so as to be in contact with the second coating film and a portion of the first coating film that is not covered with the second coating film,
the third coating film has a refractive index of 1.5210 or more,
the second coating film includes
a colored film colored in a predetermined color, and
a transparent film laminated on the third coating film side of the colored film, the transparent film being transparent and having a glass transition temperature lower than the glass transition temperature of the third coating film, and
the transparent film is in direct contact with the third coating film.

10. An exterior component of a vehicle, comprising:
a substrate; and
a multilayer coating film covering a surface of the substrate, wherein
the multilayer coating film includes
a first coating film closest to the substrate,
a second coating film that is in contact with the first coating film and covers a part of the surface of the first coating film, and
a third coating film that is transparent and covers the first coating film and the second coating film so as to be in contact with the second coating film and a portion of the first coating film that is not covered with the second coating film,
the third coating film has a refractive index of 1.5210 or more,
the first coating film includes
a colored film colored in a predetermined color, and
a transparent film laminated on the second coating film side of the colored film, the transparent film being transparent and having a glass transition temperature lower than the glass transition temperature of the third coating film, and
the transparent film is in direct contact with the second coating film.

* * * * *